Jan. 19, 1960 C. E. LOMAX 2,921,980

PREPAY POSTPAY PAYSTATION TELEPHONE ARRANGEMENT

Filed Sept. 28, 1955 8 Sheets-Sheet 1

INVENTOR.
CLARENCE E. LOMAX
BY [signature]
ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 2

TRK. CKT. 100

INVENTOR.
CLARENCE E. LOMAX
BY *[signature]*
ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 3

CONNECTOR SW. 300

INVENTOR.
CLARENCE E. LOMAX

BY [signature]

ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 4

CONNECTOR SW. 300

INVENTOR.
CLARENCE E. LOMAX
BY [signature]
ATTY.

PREPAY POSTPAY PAYSTATION TELEPHONE ARRANGEMENT

Filed Sept. 28, 1955 8 Sheets-Sheet 5

INVENTOR.
CLARENCE E. LOMAX
BY Wm. Walter Owen
ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 6

INVENTOR.

CLARENCE E. LOMAX

BY Wm. Walter Owen.

ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 7

INVENTOR.
CLARENCE E. LOMAX
BY Wm Walter Owen
ATTY.

Jan. 19, 1960 C. E. LOMAX 2,921,980

PREPAY POSTPAY PAYSTATION TELEPHONE ARRANGEMENT

Filed Sept. 28, 1955 8 Sheets-Sheet 8

*INVENTOR.*
CLARENCE E. LOMAX

*BY* [signature]

ATTY.

United States Patent Office 2,921,980
Patented Jan. 19, 1960

2,921,980

PREPAY POSTPAY PAYSTATION TELEPHONE ARRANGEMENT

Clarence E. Lomax, Chicago, Ill., assignor to General Telephone Laboratories, Incorporated, a corporation of Delaware Application September 28, 1955, Serial No. 537,240

17 Claims. (Cl. 179—6.5)

The present invention relates in general to a telephone system and more particularly to a telephone system wherein a paystation is controlled to operate as a prepay paystation on a local call and as a postpay paystation on a toll call and on a reverse charge call, and wherein a paystation identification signal of a predetermined duration is provided for an operator at her command on a toll call from a paystation.

A toll call from a substation is generally routed to a CLR trunk whereby an operator is signalled. When the operator connects her cord circuit to the trunk she receives a paystation identification signal, if the call has been initiated from a paystation to enable her to distinguish between a call from a regular subscriber line and one from a paystation line. If the call originates from the latter type line, she requests the deposit of the proper coin value before completing the desired connection. From time to time, as the call proceeds beyond a predetermined period, the deposit of more coins is requested and after release of the connection a coin magnet at the paystation is operated in the case of a prepay type station, to collect the deposited coins. The coin deposit and collecting operations also take place on a reverse charge call to a prepay paystation. One difficulty arising from the aforedescribed operations is the failure on the part of the operator to receive a paystation identification signal so that she simply tickets the call instead of requesting a coin deposit and another difficulty arises in collecting a heavy load of deposited coin due to the fact that the coin magnet is not able to rotate the coin trap to the collect position with the power available thereto.

The failure on the part of the operator to receive the paystation identification signal arises from the arrangement whereby the signal is made only momentarily effective when the operator plugs into the CLR trunk. If her attention is diverted, she is likely to miss it, while on the other hand providing a signal of a substantial time duration so that the operator's attention is eventually called to it, is unpractical because of the resulting delay in the completion of a connection if the equipment for providing the signal is operated beyond the time necessary for the operator to identify the signal. To avoid these problems the operator in the present invention manipulates a key at her cord circuit at such time as she is prepared to listen for an identification signal. The signal is then made momentarily effective so that it will not delay the completion of any connection and the operator is certain of being able to identify a call from a paystation.

To eliminate the problem of collecting large and heavy coin loads deposited in the course of a toll call from a prepay paystation or on a reverse charge call thereto, the present invention is arranged so that a coin magnet at the station is operated to throw the coin trap thereat into the collect position after a connection is established to a CLR trunk or whenever a connection is established to a paystation. The coin magnet is thereafter restored, but the coin trap upon which coins normally fall, remains in the collect position until the connection is released so that whatever coins are deposited, after the connection is completed, fall directly into the coin hopper and are thus collected. This eliminates the necessity of operating the coin magnet, after a heavy load of coins are deposited on the coin trap, to collect them. To restore the arrangement to normal, a potential is provided which activates a magnet for throwing the coin trap at the paystation into the refund position, and on its deactivation, the trap is returned to the normal position. Thus by applying this potential at appropriate time coins which are on deposit may also be refunded and the paystation restored to normal. A coin magnet apparatus comprising several magnets and associated equipment and arranged so that one magnet is used for a collect operation and the other for a refund operation is disclosed in an application Serial No. 537,231, filed by Sengebusch on September 28, 1955, now Patent 2,905,763, issued September 22, 1959, and it is representative of the particular type of coin magnet apparatus intended to operate with the invention described in the present application. A coin spring operation such as disclosed in U.S. Patent No. 2,674,655, issued to Gallagher on April 6, 1954, which permits automatic control of the switching apparatus from a prepay paystation only after the deposit of two nickels or a dime, is incorporated in the description of the invention although it is not necessary to the functioning thereof. The aforementioned coin magnet apparatus is designed to operate with a coin trap arrangement of the type disclosed in U.S. Patent No. 1,043,219, issued on November 5, 1912, to Forsberg and is arranged so that any coin falling into the trap will fall into the collect hopper, once the collect winding has been operated and despite its deenergization. A set of coin springs are also operated when a collect operation is performed to prepare a circuit to the refund winding or magnet, which magnet in turn is operated to restore the springs and prevent coins from falling directly into the collect hopper.

In summary the present invention provides ordinary prepay paystation service on local calls from a paystation with the exception that after the paystation is thrown into the collect position, it is then restored to normal by the application of refund potential in a manner to be explained. Ordinary reverse battery exchange potential is used to operate the coin magnet for a collect operation. This can be done because the coin load on a local call including a call to an operator for extending a toll connection is never more then two nickels or a dime and therefore the coin magnet requires little power. This is advantageous and economical as it eliminates the need for expensive central office equipment used for applying a high voltage pulse to the magnet, as in the ordinary prepay paystation, for collecting coins on deposit. On toll calls the paystation is connected to an operator's CLR trunk which automatically furnishes refund potential to refund any deposit and then reverses battery so that the paystation is thrown into collect position. The aforementioned coin apparatus is designed to retain the coin trap in the collect position so that any coins deposited thereafter fall directly into the coin hopper without the necessity of a further collection attempt. The operator is signalled that a call is awaiting her and after plugging her cord circuit into the trunk circuit and on being able to give the calling party her full attention manipulates a key at her cord circuit for enabling the identification signal to be given to her so that she knowns the paystation is calling. If the call is from a paystation, she requests the deposit of the proper coin value and completes the connection. The deposited coins fall directly into the hopper without any further operation being necessary to collect them. On release of the connection a high voltage refund potential is automatically connected to the paystation so that it is returned to the prepay position.

Figure 1:
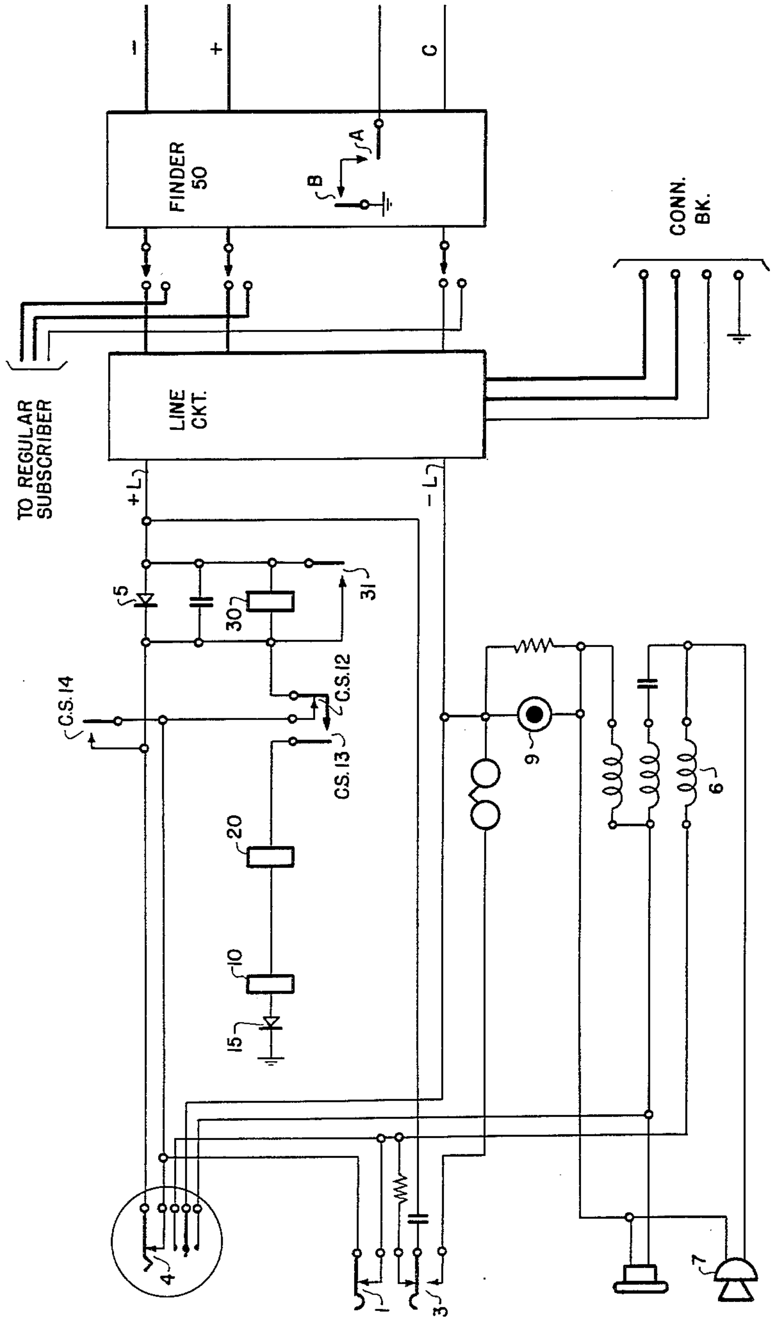
Figs. 1 and 2 illustrate the paystation circuit arrangement and a Trunk Circuit 100 respectively, the latter being located between a Finder 50 and a Selector 200 for furnishing high voltage refund potential to the paystation on the release of a connection established therefrom.
Figure 2:
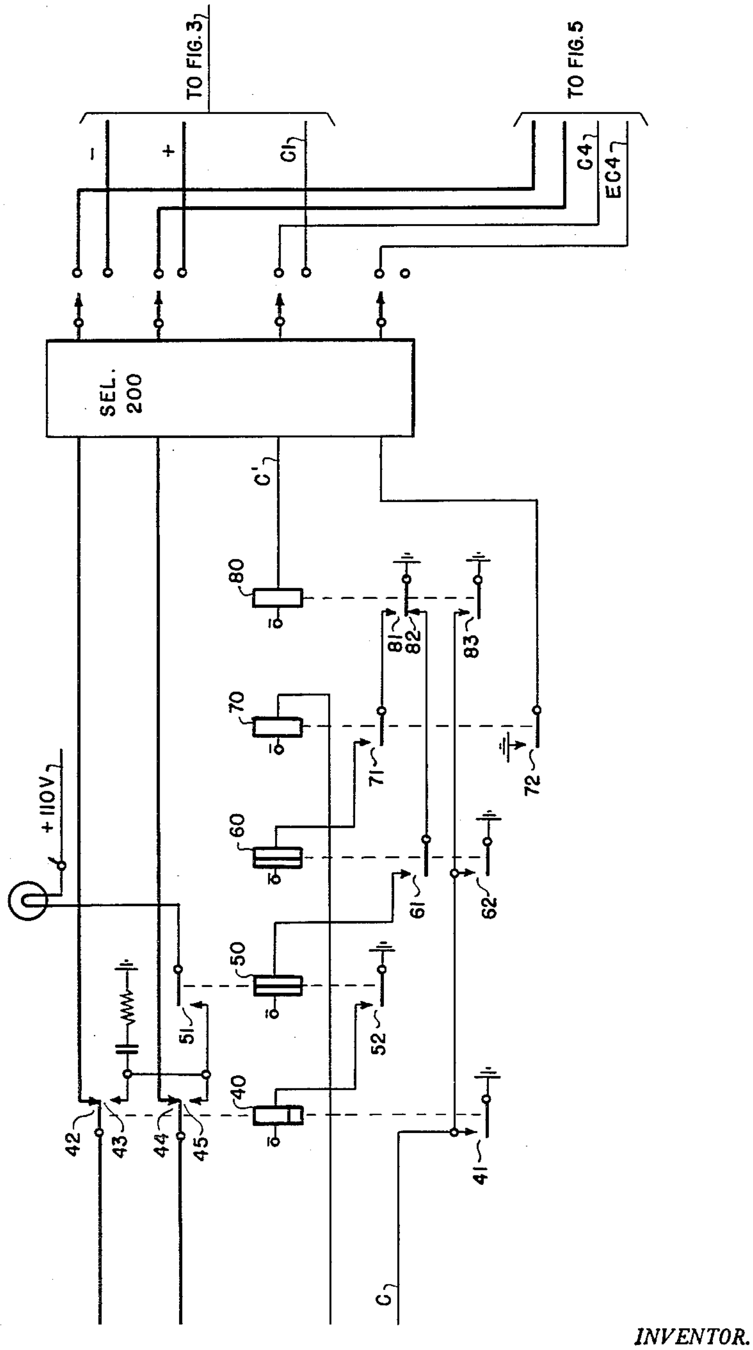

A subscriber at a prepay paystation initiates a call by removing his handset and depositing the proper coin value, in this case being two nickels or a dime, to operate the coin springs for enabling dialling. The collect magnet or collect relay 30 is normally connected to the line but remains unenergized due to the shunt provided by rectifier 5 while magnets 10 and 20 are connected to the line by C.S. 13 on deposit of a coin, but remain unenergized unless a high voltage positive pulse is returned over the line in a manner that will be explained. Springs C.S. 13 are also controlled on operation of the magnet 30 in a manner described for the equivalent collect relay in the aforementioned Sengebusch application. Relay 10 is not described in the Senegbusch application as it is structurally unrelated thereto, however its function is described in the Gallagher patent as insuring the restoration of springs such as C.S. 14 and is therefore connected in series with magnet 20 for accomplishing that purpose. The finder and selector switches utilized are the well-known Strowger type switches although any other well-known switching apparatus may be provided. The paystations are connected at a particular level in the finder banks so that the normal post springs B of the Finder 50 prepare a circuit on reaching the paystation level. The prepared circuit is completed to the Trunk Circuit 100 for controlling a relay 70 thereat, when the finder switch-through relay (not shown) operates, and it simultaneously switches the conductors +L and −L through to the line relay (not shown) of the Selector 200. The selector switch is provided with a fourth wiper over which ground is forwarded by the controlled relay 70 from the Trunk Circuit 100. This identification ground is utilized only when the selector is operated by a predetermined dialled digit to seize a CLR trunk as the contacts of the selector bank associated with the fourth wiper at the CLR level are connected to respective CLR trunk identification control relays such as relay 560. If the selector is operated to size a Connector 300, the ground is not forwarded to the connector switch as the contacts in the selector bank associated with the fourth wiper at the connector levels are unconnected to any connector switch.

Figure 7:
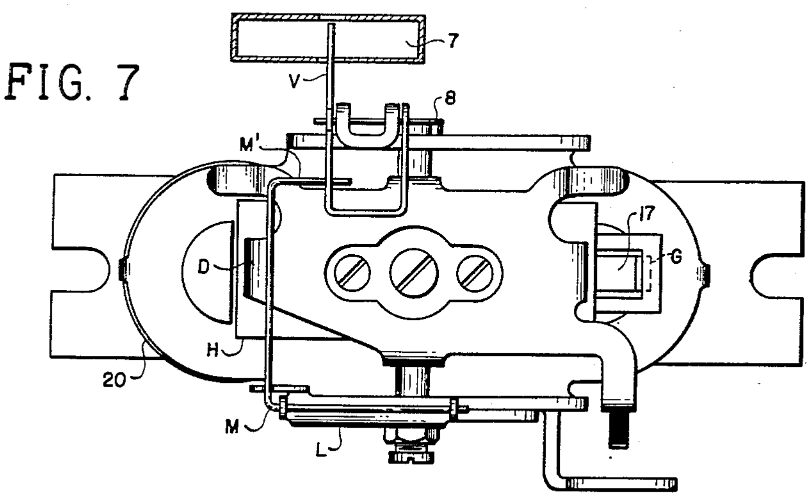
Figs. 7, 7a and 7b are three views of the type of coin control apparatus intended to be used in the present invention and they disclose the arrangement of the collect and refund relays, which are used for controlling the coin trap as shown in said Sengebusch application.
Figure 7A:
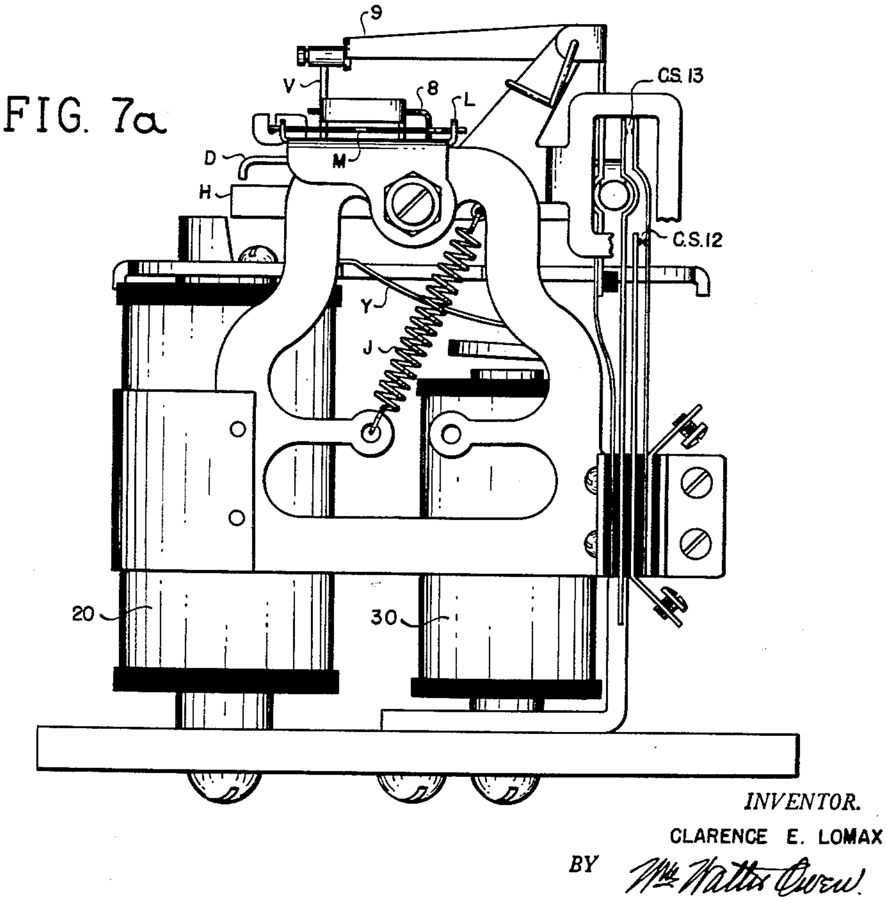
Figure 7B:
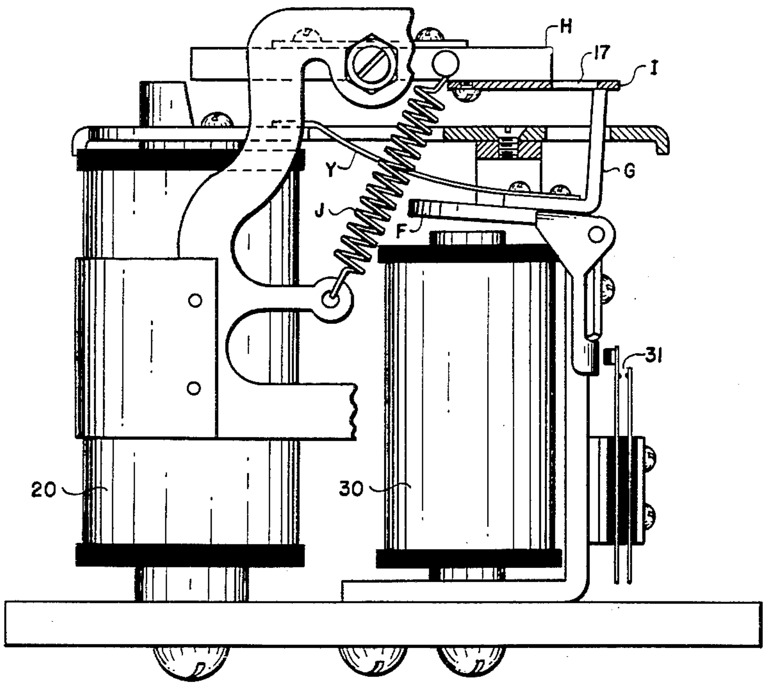

The connector switch 300 is operated by several dialled digits to connect to the called party's line, and if it finds the called line idle, it applies ringing current to the called line and on answer by the called party provides talking battery thereto through its reverse battery relay 320. The talking current is fed to the called line in a reverse direction from that normally done so that if the called station is a paystation the coin magnet thereat is operated to throw the coin trap into a collect position and also close springs such as C.S. 15 to connect the refund magnet thereat to the line. Likewise the reversal of battery by relay 320 on the loop to the calling party operates the magnet 30 thereat to throw the coin trap into the collect position, which will generally be described as the post pay position. Springs 31 operated by the magnet 30 thereupon provide a shunt around the coin magnet 30 and rectifier 5 to enable a talking circuit to be completed, while deenergizing the magnet. When magnet 30 is energized it attracts armature F as shown in Fig. 7b so that arm G is located beneath aperture 17. This allows spring J to rotate armature H in a clockwise direction to allow the back side of G to engage one edge of aperture 17, while spring Y forces G against the edge of aperture 17, when magnet 30 is denergized, to retain armature H in its operated position. The trap opens when armature H is operated so that a deposited coin is collected while the springs remain in their operated position on deenergization of magnet 30.

In the event the called station is a paystation, ground is connected to a contact associated with the fourth wiper of the connector switch to operate a relay 450 in the connector switch. This relay controls the connector switch on release of the connection to forward refund potential to the called line to restore it to the prepay position. Likewise the Trunk Circuit 100 between the finder and selector switches provides refund potential to the calling paystation on release of the selector switch to operate the refund magnet 20 and magnet 10 at the calling paystation. The refund magnet 20 at the paystation rotates armature H in a counterclockwise direction to the refund position and then allows it and the operated coin springs C.S. 12 and C.S. 13 and the shunt springs 31 to return to normal when the refund potential is removed to deenergize magnet 20 while magnet 10 operates for no purpose but to insure that the nickel operated shunt springs C.S. 14 are open. It will be noted, when armature H returns to its equilibrium position, the arm G is located under I due to the action of spring Y thereby preventing armature H from being rotated past the equilibrium position by spring J. The Trunk Circuit 100 applies the high voltage refund potential only for a predetermined time and then restores to enable the finder switch 50 to restore.

An operator on completing a toll call to a called paystation utilizes any well-known type of trunk circuit which forwards ground over a fourth wiper of any well-known type of four wiper toll selector to the aforementioned connector switch. The connector switch is operated as previously described, however it does not ring the called party until the ground is removed from the fourth wiper of the toll selector switch. The operator momentarily removes ground from the fourth wiper of the toll selector switch to enable the connector switch to ring the called station. This arrangement permits the operator to control the ringing operation so that the called party may be rung again in the event an insufficient sum is on deposit at the time the call is terminated. When the called party answers talking battery is furnished from the trunk circuit instead of the connector switch as was done on a local call. The talking battery is fed to the called station in a direction which prevents the rectifier thereat such as 5 from shunting the collect magnet such as 30. The collect magnet at the called station then operates to connect the refund magnet thereat to the line and throws the called paystation into the post-pay position as previously described. When armature H is rotated in a clockwise direction, plate D as shown in Fig. 7a is likewise rotated to pivot wire M in its bracket. This causes coin trigger V to pivot about 8 and rotate arm 9 about 11 to close C.S. 13 and open C.S. 12. The operator may now request the deposit of as many coins as necessary. The deposited coins now fall directly into the coin hopper without the necessity of a collect attempt as armature is held in the collect position as already explained. The previously described called paystation test relay 450 in the connector switch is operated to enable the connector to supply high voltage refund potential to the called line on release of the connection to reset the mechanism thereat so that it is once again in the prepay position.

When a party at a paystation is completing a call to a toll operator, a finder and a selector switch and a trunk circuit such as 100 are utilized as on a local call. The selector on being operated to the CLR trunk level searches for an idle CLR trunk and on finding the same switches through to the idle CLR trunk. The ground on the fourth wiper of the selector switch is forwarded over the associated contact to the CLR trunk for operating a relay thereat to control a paystation identification tone. The operator on being signalled plugs her cord circuit into jack J2. The tone, however, is not forwarded to her until she is prepared to receive it at which time she closes contacts 606 to cause the tone to be connected to her position circuit so that she may hear it. The cord circuit is of any well-known type specifically adapted to enable ground to be forwarded thereover from contacts 606 to the CLR trunk to initiate a series of operations for enabling the tone to be heard. The cord circuit has a position circuit associated therewith of any well-known type whereby the operator may converse with the calling or called parties. The CLR trunk has in the meantime applied high voltage refund potential to the calling paystation to cause the refund of a deposit thereat and then applies reverse battery to the calling paystation to throw it into the postpay position. The operator proceeds to secure the called party by utilizing any well-known type of toll line circuit indicated by the block 650 and requests the deposit of the proper coin value from the calling party. The deposited coins fall directly into the coin hopper without necessitating of collect attempt. The operator then completes the connection. Had the called party restored his handset before completion of a connection he may be rerung from the CLR trunk and the procedure just described initiated. On release of the connection by both the operator and the calling party, the CLR trunk enables the selector switch to restore, and on restoration of the selector switch, Trunk Circuit 100 is caused to forward high voltage refund potential to the calling paystation to return it to a prepay position as previously described. If springs such as C.S. 14 are closed due to the deposit of an odd number of nickels, they will of course, be opened by magnet 10 operating on the refund pulse.

*Local call*

A paystation subscriber initiates a call by removing his receiver from the hookswitch to disconnect the ringer from across the line at contacts 3 and completes a circuit for operating his line circuit line relay (not shown) over a circuit from ground on the +L conductor, rectifier 5 shunting magnet 30, dial coin springs 4 in shunt with the spring C.S. 12, hookswitch springs 1, inductance 6, transmitter 7, the coin transmitter 9 and its associated shunt resistor to battery through the line relay over the —L conductor. The line relay operates to cause the association of a finder selector link comprising the Finder 50, Trunk Circuit 100 and Selector 200 with the calling line in any well-known manner.

The calling party can not dial a digit on the selector as long as dial springs 4 are shunted by coin springs C.S. 12. He therefore deposits a coin in an appropriate coin chute to open coin springs C.S. 12 and close coin springs C.S. 13. A coin falling through chute 7 strikes coin trigger V to rotate arm 9 and it in turn operates springs C.S. 12 and 13. If only one nickel is deposited coin springs C.S. 14 are closed to shunt the dial springs 4 thereby necessitating the deposit of a second nickel which opens C.S. 14, as described in the Gallagher patent. The dial springs 4 are now effective for operating the switching equipment. Depositing a dime, of course, opens C.S. 12, closes C.S. 13 and leaves C.S. 14 as shown so that the dial springs 4 are effective to operate the switching equipment. Magnets 10 and 20 remain unoperated, when C.S. 13 close as ground potential is provided at the left of rectifier 15 and rectifier 15 is arranged to block the transmission of negative potential from the line, while magnet 30 remains shunted by rectifier 5. This arrangement also prevents the positive side of the line from being robbed of any current.

In the normal prepay paystation arrangement the coin magnet is connected between ground and the positive side of the line after the deposit of a coin to ensure that the pulsing relay connected to the negative side of the line in the switching equipment releases on the opening of the dial springs during the dial operation. To prevent the pulsing relay from being slow to pull up with the impedance of the coin magnet connected to the positive side of the line on the closing of the dial springs, the positive side of the line is connected directly to ground when the pulsing relay is pulsed. An impedance winding normally connected in the positive line is provided to balance the line and it is also shunted by the direct ground, when the pulsing relay is pulsed, and therefore the ground must be removed after pulsing. This is an expensive arrangement whose necessity is eliminated by the rectifier 15 connected between ground and the positive line through magnets 10 and 20 so as to effectively prevent current from passing through 10 and 20. The direct ground for the positive side of the line is then unnecessary and the line relay or pulsing relay of the switching equipment is able to pull up properly during the operation of the dial springs. This permits an inexpensive double wound low impedance relay to be used as a line or pulsing relay in the central office equipment in connection with the paystation.

The Finder 50 is provided with normal post springs, shown diagrammatically at B, arranged to close when the finder reaches the level at which the paystations are connected in the finder banks. When the Finder 50 finds the calling line, the line circuit line relay is disconnected and the finder switch-through relay (not shown) is operated to close contacts A and complete a circuit for relay 70 from ground at B. Relay 70 closes contacts 71 to prepare a circuit for relay 60, and closes contacts 72 to forward a paystation identification ground to the fourth wiper of the Selector 200, when its switch-through relay (not shown) is operated. This ground is only forwarded from the selector on calls to a toll operator to enable her to identify a paystation. It has no effect on local calls as the selector levels having access to a connector switch have the bank contacts corresponding to the fourth wiper unconnected. The finder switch through relay also closes a loop circuit from the dial springs 4 and the —L and +L conductors extended over the line circuit and finder, contacts 42 and 44 respectively to the selector switch line relay (not shown) and battery and ground respectively. The selector switch line relay operates to cause seizure of the selector, and it returns ground over lead C′ to operate relay 80. Relay 80 closes contacts 81 to complete the previously prepared circuit to slow-to-release relay 60 over contacts 71. At contacts 83 it closes ground to the C lead to maintain the finder switch busy in a well-known manner. Relay 60 operates to prepare a circuit for relay 50 at contacts 61 and at contacts 62 returns an additional busy ground over the C lead.

The calling party having deposited two nickels or a dime and having received dial tone from the selector switch dials the first digit of the called party's number to operate the Selector 200 to a corresponding level where it searches for a connector switch such as 300.

The selector switch tests for battery over lead C1, V.O.N. springs 357 and the upper winding of slow-to-release relay 350. A ground forwarded over lead C1 from the selector eenrgizes the upper winding of relay 350 to operate relay 350. Relay 350 now closes contacts 351 and 353. Closing of contacts 353 prepares a circuit for the lower winding of relay 410 over the lead EC, which is not connected in the banks of the local selectors and therefore the circuit cannot be completed. Contacts 351 on closing prepare a circuit for the lower winding of relay 350 and the vertical stepping magnet VM. The switch through relay (not shown) in the selector operates in any well-known manner when battery is found on lead C1 and extends the dialling loop over the (—) and (+) conductors, contacts 361 and 322 to battery through the upper winding of relay 330 and through the upper winding of relay 310, contacts 363 and 325 to ground through the lower winding of relay 330 respectively. Relay 310 closes its X contacts only at this time to prepare a circuit for its lower winding. Relay 330 operates to close contacts 331 which completes a circuit to operate slow-to-release relay 340. Ground is now connected to the C2 test wiper from contacts 341, conductor 375, contacts 422, the lower winding of relay 440 and contacts 431. Relay 340 also closes ground to the hold conductor 376 at contacts 342 to energize the lower winding of relay 310 over its X contacts. Relay 310 closes contacts 311 to shunt its upper winding from the loop and at contacts 312 opens the circuit whereby a toll selector searches for battery over lead T.C. thereby busying the connector 300 to the toll selectors. Contacts 343 closed by relay 340 maintains the connector 300 busy to the local selectors and the upper winding of relay 350 energized over V.O.N. springs 357. At contacts 344 another point in the circuits to the lower winding of relay 350 and the vertical stepping magnet VM is prepared, while at contacts 346 a circuit is prepared from the wiper EC2 to relay 350. At contacts 347 a point is opened in an incomplete circuit to relay 460.

The calling subscriber on proceeding to dial operates dial springs 4 to open and close the loop circuit to relay 330 a number of times corresponding to the dialled digit. Relay 330 releases each time the loop is opened to complete a circuit over contacts 332, 344 and 351 for energizing the vertical stepping magnet VM and the lower winding of relay 350. Relay 340 is slow-to-release and therefore maintains its contacts operated when contacts 331 open. The vertical stepping magnet VM deenergizes each time contacts 332 open to step the connector switch wipers to a level corresponding to the number of times relay 330 is pulsed. When the connector switch takes its first vertical step V.O.N. springs 357 and 358 open. Opening of V.O.N. springs 357 opens the energizing circuit for the upper winding of relay 350, however as it is slow-to-release and as the intermittent closure of contacts 332 completes the described circuit to its lower windings, it maintains its contacts operated until the end of the digit, when contacts 332 remain open at the end of the first digit to deenergize its lower winding. Contacts 353 open when relay 350 is restored to open the prepared circuit for the lower winding of relay 410. Contacts 351 open while contacts 352 close to prepare a circuit to the rotary stepping magnet RM. V.O.N. springs 358 opening on the first vertical step open another point in the test circuit extending over lead T.C. In the meantime V.O.N. springs 359 closed on the first vertical step to prepare a circuit for the release magnet.

When the second digit is dialled contacts 332 are again pulsed to complete a pulsing circuit over contacts 344, 352, 425, and 449 for the rotary magnet RM. Slow-to-release relay 430 is energized over the same contacts on the first closure of contacts 332. The rotary magnet steps the wipers to a position corresponding to the second dialled digit while relay 430 disconnects wiper C2 at contacts 431 from ground at contacts 341 through relay 440 and at contacts 432 connects wiper C2 to battery through relay 420. At contacts 435 it completes an alternate operating circuit for itself, which is similar to its described operating circuit with the exception that contacts 435 are in shunt with contacts 425. This is done to prevent relay 430 restoring before the end of the digit as relay 420 may operate to open the circuit to relay 430 at contacts 425, whenever wiper C2 encounters ground potential.

At the end of the second digit wiper C2 is connected to the CN conductor of the called subscriber's line circuit, and if ground is found thereon indicating a busy condition, relay 420 is operated over contacts 432. Busy tone is now returned from contacts 421 and 363' and condenser 391 and contacts 363 to the loop to the calling subscriber to inform him that the called line is busy. At contacts 426 relay 420 opens a point in the incomplete circuit to the release magnet. At contacts 422 it disconnects conductor 375 from the lower winding of relay 440 and prepares its own holding circuit at contacts 423, while at contacts 425, it opens the original operating circuit for relay 430 and the rotary magnet RM. The circuit to relay 430 is already open at contacts 332 and when it restores the holding circuit for relay 420 is completed over contacts 341, 423 and 433. The C2 wiper is again connected to the lower winding of relay 440 at contacts 431, however the lower winding of relay 440 cannot be energized as no circuit thereto is completed.

If battery potential is provided to the CN conductor indicating the called line is idle, relay 420 on being connected thereto remains unoperated. Now when contacts 332 open at the end of the digit to restore relay 430, the lower winding of relay 440 is connected to ground over contacts 422 and 341 and to battery over contacts 431, the wiper C2 and the CN conductor. Both relay 440 and the called subscriber's line circuit cut-off relay (not shown) operate in this circuit. Relay 440 closes its X contacts to complete an energizing circuit for its upper winding from ground on the hold conductor 376, through its upper winding to battery through relay 430. Relay 430 does not operate in this circuit. Relay 440 is now fully energized and it closes contacts 446 to prepare a holding circuit for the lower winding of relay 410, and it closes contacts 448 for no purpose as the connector has been seized by a local selector. It grounds wiper C2 and the CN conductor at contacts 445 thereby busying the called line, and opens contacts 449 to open another point in the original operating circuit for relay 430 and the rotary magnet. At contacts 442 and 443 it completes a circuit for applying ringing current with battery superimposed thereon to the called party's ringer from the left side of the upper winding of relay 410, contacts 411, 442, 471 the —N conductor, the loop to the called party's ringer including the +N conductor, contacts 473, 443 to ground at contacts 414. At contacts 441, it returns ring back tone over contacts 413, 361', condenser 390, contacts 361 and the (—) conductor over the loop to the calling party. Contacts 446' open to open a point in the release magnet circuit.

When contacts 447 close a circuit is completed, if the called station is a paystation from ground connected to the paystation connector bank contacts associated with wiper EC2, over contacts 447 and 346 to relay 450. Relay 450 operates and prepares a circuit for relay 460 at contacts 452 and an alternate holding ground for the upper winding of relay 440 at contacts 451. As the paystation is thrown into the postpay position on answer, relays 450 and 460 and 470 are provided and operate in a manner which will be described to retain the connector in position, after the parties release the connection, and to provide refund potential therefrom for restoring the paystation to normal. Although the paystation need not be thrown into the postpay on local calls, the connector switch which is also used by an operator on a reverse charge call does so automatically and therefore means must be provided for returning it to normal. Such means could be located in the line circuit, however by locating the same in the connector switches the number required is reduced and considerable economy affected.

If the called party answers, his ringer is disconnected and a D.C. loop is completed from battery and generator through the upper winding of relay 410, contacts 411, and 471 the loop to the called party's telephone, contacts 473, 443 to ground at contacts 414. The upper winding of relay 410 is energized to close only contacts 418 and complete a circuit for its lower winding from ground at contacts 446 and over contacts 369. It now is fully energized and operates all of its contacts. At contacts 411 the called subscriber's loop to the upper winding of relay 410 is opened while at contacts 412 the loop is extended from the —N conductor and contacts 442, through contact 361′ to ground through the lower winding of relay 320 and from the +N conductor and contacts 443, through contacts 415 to contacts 363′ and battery through the upper winding of relay 320. Relay 320 operates and opens contacts 322 and 325 while closing contacts 323 and 324 to reverse battery and ground from relay 330 to the —L and +L calling paystation conductors. At contacts 328 it closes an additional ground to conductor 376 and the upper winding of relay 440. At contacts 326 an alternate circuit from ground at contacts 447 and the EC2 conductor is completed, for operated relay 450.

Due to the reversal of polarity on the +L and —L conductors current no longer flows through rectifier 5 and instead flows through magnet 30 which operates to attract armature F thereby closing springs 31 and rotating armature H in a clockwise direction. Springs 31 shunt rectifier 5 and magnet 30, which is deenergized. As armature F is held in its operated position for reasons already explained after deenergization of magnet 30, springs 31 remain closed after magnet 30 is deenergized. Armature H on its clockwise rotation allows the coin trap mechanism to release deposited coin or coins lying on the coin trap into the collect hopper. The coin trap will continue to drop deposited coins into the collect hopper as long as H is in the described position. The arrangement is retained in this postpay position until magnet 20 is operated when the connection is released. Likewise it will be noted that the potentials applied to the —N and +N conductors from relay 320 are such as to operate a magnet such as 30 at a called paystation to throw the called paystation into a postpay position as described above.

A talking loop including the calling party's handset, the L and —L leads, contacts 363, condenser 391, contacts 363′, 415, 443 and 473 and contacts 361, condenser 390, contacts 361′, contacts 412, 442 and 471, respectively, and the +N and —N conductors to the called party's telephone is completed, when the coin magnets at both stations are operated and shunted by their respective shunt springs.

When the called party hangs up, the loop to relay 320 is opened. If relay 450 is operated indicating that the called station is a paystation, relay 320 on release prepares a circuit to relay 460 at contacts 327, which would be completed but for the fact that relay 340 is holding contacts 347 open. It also restores normal battery to the calling end of the loop while at contacts 328 and disconnects a ground from conductor 376 and the upper winding of relay 440. The calling party on hanging up opens the loop to relay 330 which in turn opens the circuit to slow-to-release relay 340 at contacts 331. Contacts 332 close to prepare a circuit to the release magnet which circuit is retained incomplete by operated relay 440. Relay 340 on releasing completes the prepared circuit over contacts 327, 347, 372, 417 and 452 to slow-to-release relay 460 assuming relay 450 is operated due to the called station being a paystation. Relay 460 operates to close contacts 461. This prepares a circuit at contacts 461 for applying +110 volt potential to the called paystation. At contacts 462 a circuit is completed to slow-to-operate relay 470 while at contacts 463 a point is opened in an incomplete circuit to relay 360. Relay 470 operates and closes contacts 475 to provide another ground for relay 440 and also close contacts 474 and 472 to apply the +110 volt to the called paystation over both the —N and the +N sides of the line, springs such as 31, C.S. 13, magnets such as 20 and 10, and through a rectifier such as 15 to ground. As previously mentioned, when the coin magnet such as 30 is operated, coin springs such as 13 are closed to connect the refund magnet such as 20 to the line. The magnet such as 20 at the called station operates to first rotate the armature H in a counter-clockwise or refund position and then restore it and coinsprings C.S. 12 and 13 to normal. Magnet 10 is also operated but for no purpose as the nickel operated shunt springs such as C.S. 14 are open.

Ground is removed from the C1 conductor at contacts 340, when relay 342 restored, and the selector releases. The connector 300 cannot be seized, however, as battery is not provided for the C1 or TC leads. Ground is also disconnected from conductor 376 at contacts 342 so that relay 440 is held only by ground at contacts 451 and by ground at contacts 475, when relay 470 operates. With relays 320 and 340 released so that ground is no longer connected to relay 450 over contacts 326 and 346, respectively, and from contacts 447 and the EC2 wiper, relay 450 restores after a period of time to restore relay 460 at contacts 452 and relay 470 is restored in turn at contacts 462. As relays 450 and 460 are slow-to-release, the 110 volt potential is applied for a considerable period, and when relay 460 restores, it releases relay 470 at contacts 462. Release of relays 450 and 470 opens contacts 451 and 475, respectively, to restore relay 440 and it completes the circuit to the release magnet over contacts 332, 345, V.O.N. springs 359 and contacts 446′, and simultaneously restores relay 410 at contacts 446. In the event the called station is not a paystation relay 450 remains unoperated and the aforedescribed circuit to the release magnet is completed under control of relay 440, as soon as relay 340 opens contacts 342 to restore relay 440. It will be noted that both parties must release before the high positive potential can be applied and that the connector switch is retained in position in the event the called station is a paystation after both parties release while the preceding switches restore, while if the called station is not a paystation the connector restores immediately.

In the event the called line is busy or the call is not answered, the calling party replaces his handset to open the loop to relay 330. Relay 330 restores relay 340. Restoration of relay 340 opens contacts 341 to open the holding circuit to relay 420 which is operated if the called line is busy. Restoration of relay 420 completes the described circuit to the connector release magnet. If relay 440 is operated and the called party has not answered, the circuit to the release magnet is completed immediately on release of relay 440 which is controlled at contacts 342, if relay 450 has not yet operated. Relay 340 also opens the circuit for relay 450, if it is operated, at contacts 346, and relay 450 restores to restore relay 440.

The selector on releasing removes ground from lead C′ to restore relay 80. Relay 80 on restoring completes a circuit at contacts 82 and over contacts 61 to slow-to-release relay 50. Slow-to-release relay 50 operates to complete at contacts 51 a circuit to relay 40, and at contacts 51 a circuit is prepared for applying +110 volts to the L and —L conductors. The circuit to relay 60 is now open at contacts 81, however, it is slow to release and contacts 62 remain closed, until slow-to-operate relay 40 operates for closing contacts 41 to ground lead C and maintain the finder switch seized. Relay 40 on operating causes +110 volt potential to be forwarded from contacts 51 over contacts 43 and 45 to the calling paystation to operate magnets 10 and 20 as described for the calling paystation to accomplish the aforementioned purposes.

In the event the call was not answered, battery and ground potentials were not reversed on the +L and —L conductors and magnet 30 remained unoperated. The +110 volt potential is returned over the finder from the Trunk Circuit 100 as previously described on release of selector and over rectifier 5, C.S. 13, magnets 20 and 10 and rectifier 15 instead of springs 31, C.S. 13, magnets 20 and 10 and rectifier 15. The operation of the magnets and the results thereof are the same, however, with the exception that springs 31 are not restored as they are unoperated and the coin trap dumps any deposited coin into chute and then is returned to normal.

*Reverse charge call*

Figure 3:
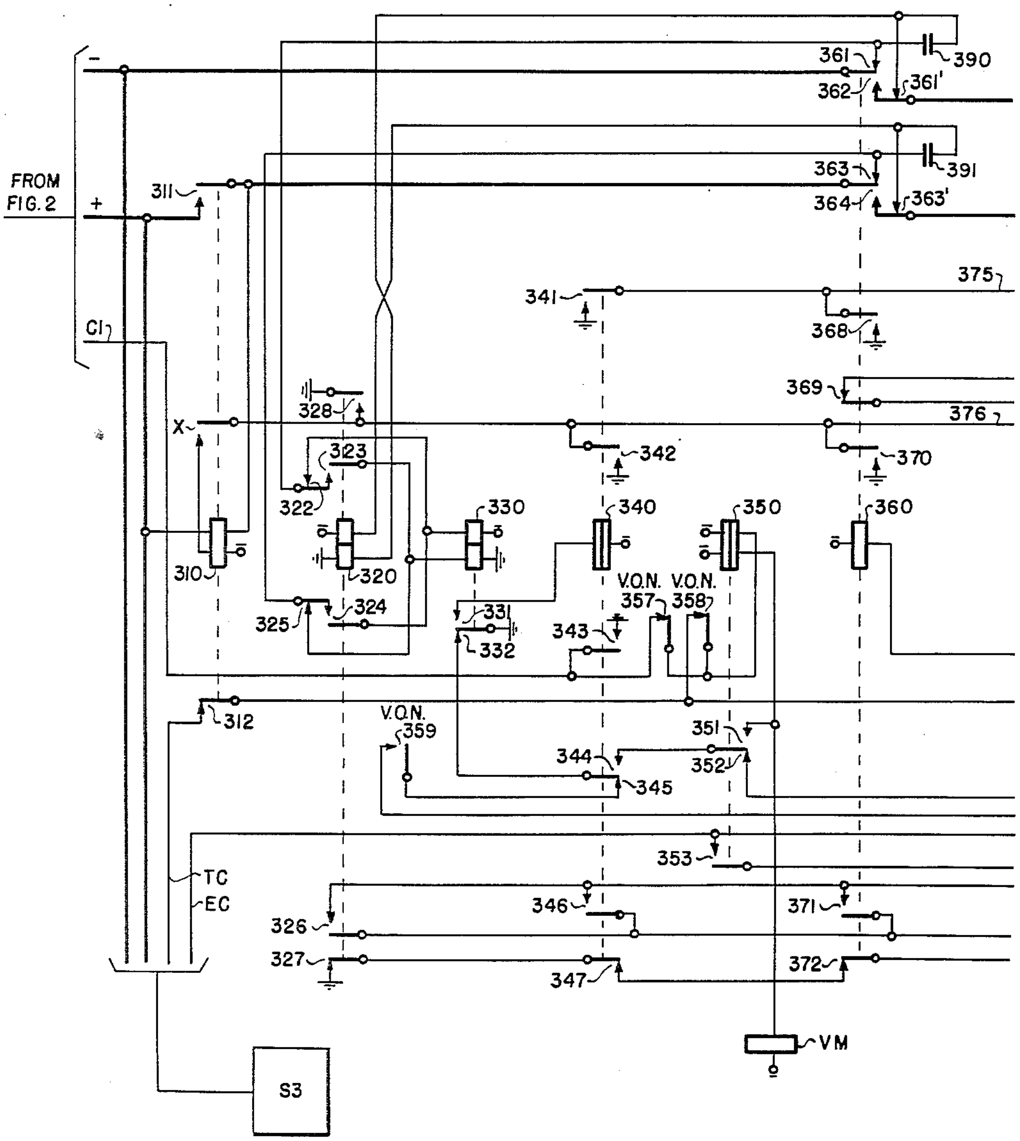
Figs. 3 and 4 illustrate the connector switch circuits utilized in the present invention.
Figure 4:
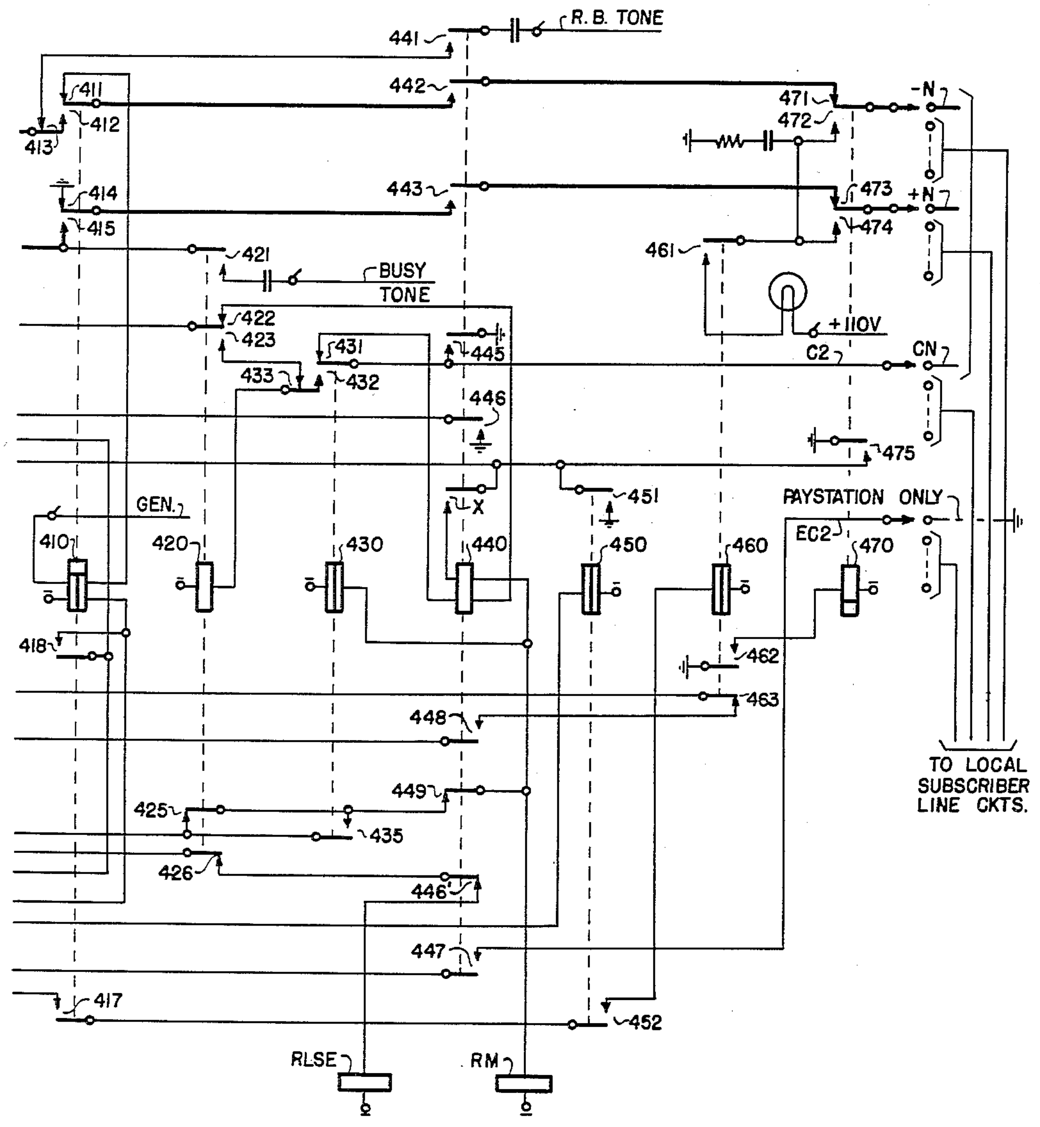
Figure 5:
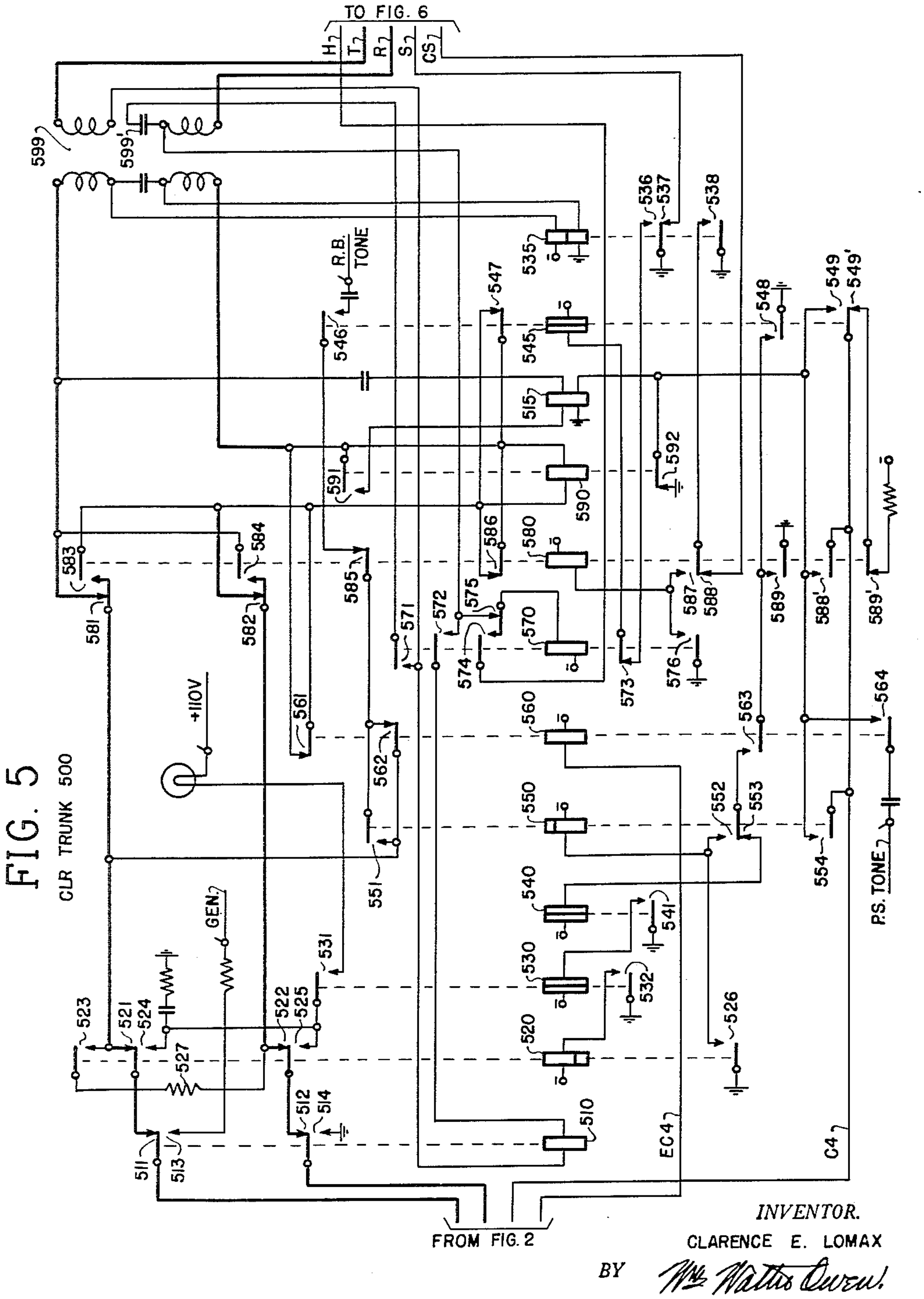
Figs. 5 and 6 illustrate the CLR Trunk 500 and the operator's Cord Circuit 600 respectively.
Figure 6:
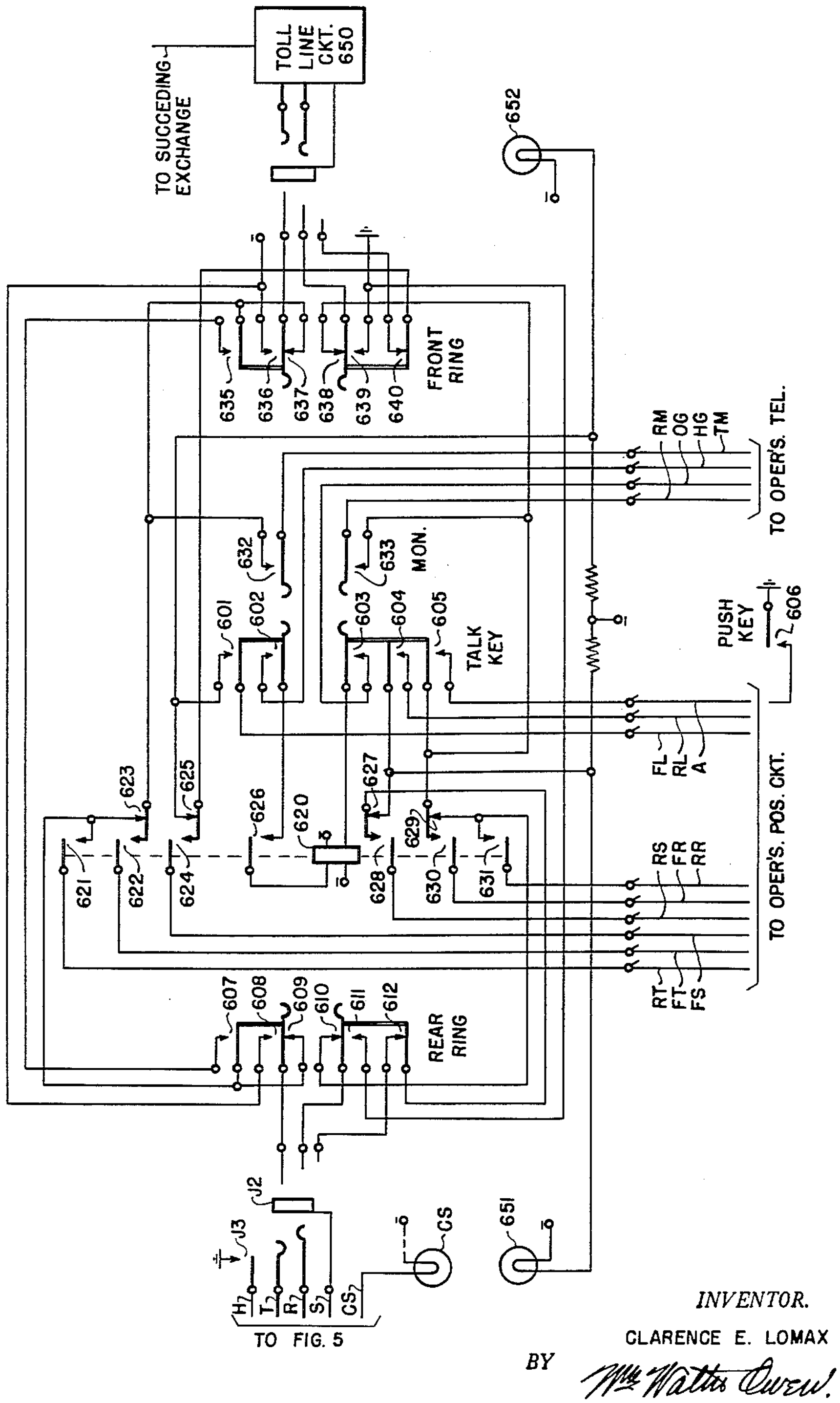

In the event an operator is completing a reverse charge call to a paystation she utilizes a trunk circuit and a toll selector which are indicated in block form by S3 in Fig. 3. The selector is operated to seize a connector such as 300 after testing for battery over lead T.C., contacts 312, V.O.N. springs 358 and the upper winding of relay 350. The switch through relay of the toll selector operates when battery is found to complete a dialling loop through the trunk circuit and the toll selector to relay 330 similar to the one previously described for relay 330 with the exception that the aforedescribed relay 310 is never inserted in the loop for the purpose of opening lead T.C. Ground is forwarded from the trunk circuit through the selector and over lead EC on operation of the toll selector switchthrough relay. Relay 350 is operated and completes at contacts 353 a circuit to the lower winding of relay 410 from ground on lead EC and also prepares the aforementioned circuit for the vertical magnet VM and for its own lower winding. Relay 330 completes the previously described circuit to relay 340. Relay 340 operates as before to prepare a point in the circuit for the lower winding of relay 350 and to the vertical magnet VM. It also grounds lead C1 at contacts 343 to busy the connector to the local selectors and also applies ground over the V.O.N. springs 357 and 358 and contacts 313 to lead T.C. Relay 410 operates to open contacts 411 and 414 and close contacts 412, 415, 416, 417 and 418. Relay 410 is now also held operated directly over contacts 418 and the ground on the EC lead.

The digits dialled over the loop to relay 330 result in connecting the connector switch wipers to the called party's line in a manner similar to that previously described on a local call. V.O.N. springs 357 and 358 open to disconnect the upper winding of relay 350 and contacts 343 from the T.C. lead. Relay 430 is operated as previously described to connect relay 420 to the C2 wiper to test the called line for a busy condition.

If the called line is busy relay 420 is operated as previously described to operate the previously described contacts and return busy tone to the operator, and she releases the connection.

If the called line is idle, relay 420 remains unoperated and relay 440 is operated as previously explained. It closes the same contacts as previously described and at contacts 448 completes a circuit including contacts 312 and 463 for relay 360 from ground on the T.C. lead. Relay 360 operates to open contacts 361, 361′, 363, 363′, 369 and 372 and close contacts 362, 364, 368, 370 and 371. Opening of contacts 361 and 363 disconnects relay 330 from the loop while closing contacts 362 and 364 connects the (−) and (+) leads to the −N and +N conductors, respectively, over contacts 412, 442 and 471 and contacts 415, 443 and 473, respectively. The operator does not receive ring-back tone at present because contacts 413 are open. Not having received busy tone the operator causes ground to be disconnected at the trunk circuit from the EC lead by operating her ring key. Relay 410 restores to release its contacts and supply ring-back tone to the operator from contacts 441 and 413 and ringing tone to the called party as already described. The (−) and (+) leads are disconnected from the −N and +N conductors at contacts 412 and 414, respectively, so the operator does not receive ringing current. Relay 330 which restores when it is disconnected from the loop restores relay 340, however relay 360 now supplies the function of relay 340 by closing ground to conductor 375 at contacts 368 to prepare the called line cut-off relay circuit; grounding conductor 376 at contacts 370 to maintain the upper winding of relay 440 energized and by completing the called paystation test circuit to relay 450 over contacts 371.

When the called party answers relay 410 closes contacts 418 only as described, however, as contacts 369 are open due to relay 360 being operated, relay 410 cannot be fully energized unless the operator has reconnected ground to the EC lead at the trunk circuit. Relay 410 is then completely energized and reconnects the (−) and (+) leads to the −N and +N conductors and disconnects the ringing current at contacts 411 and the ring-back tone at contacts 413. The operator also supplies ground over the −lead and battery over the +lead for talking battery. It will be noticed that they are connected to supply current to the called station in a reverse direction so that, if the called line is a paystation, it is thrown into the postpay position in a manner already explained. The operator may now converse with the called party and if he is at a paystation she requests the deposit of the proper coin value before completing the connection. The coins fall directly into the coin hopper now without the necessity of providing collect potential to a coin magnet and the operator need not be concerned over possible failure of a collection attempt.

At the termination of the call, the called party may replace his handset to signal the operator in any well-known manner. If the coin deposit was insufficient she may rering the called station by simply removing ground from the EC lead and restore relay 410 as contacts 369 are open and on reanswer by the called party request a further deposit. Removal of the operator's plug allows the toll selector to restore and remove ground from lead T.C. to restore relay 360. Relay 360 removes the holding ground for relay 440 at contacts 370 and it restores unless relay 450 is operated. If relay 450 is operated indicating that the call is to a paystation, relays 460 and 470 are operated as before to restore the paystation to a prepay position. Relay 460 on operating opens contacts 463 to remove battery through relay 360 to the T.C. lead to prevent the connector from being seized. Relay 360 on restoring also opens contacts 371 to allow relay 450 to restore, and when it is completely restored, the circuit for holding relay 440 operated is opened at contacts 451, and relay 440 restores. Restoration of relay 440 completes the circuit to the release magnet as previously described and allows the restoration of the connector switch. If the call had not been to a paystation relay 440 is released directly by relay 360 to in turn complete the circuit to the release magnet and the connector restores immediately.

The release operation in the case that the called line is busy is similar to that just described with the exception that relays 360, 450, 460 and 470 cannot be operated due to the failure of relay 440 to operate. Removal of the plug when a called line is busy opens the loop to relay 330 and it restores to restore relay 340. Release of 340 restores 420 to complete the circuit to the release magnet all as previously described. If the called line is idle but has failed to answer, relays 360, 440 and 450 are operated and removal of the plug causes ground to be removed from lead T.C. to restore relay 360, and it restores relays 450 and 440 in turn. As relay 410 is not operated while ringing current is applied to the called line the circuit to relay 460 cannot be completed even if relay 450 is operated, however, its operation is unnecessary as a called paystation is not thrown into the postpay position on a failure to answer.

*Toll call*

A subscriber when making a toll call from a paystation proceeds in a manner already described and a finder, trunk circuit and selector switch are associated with the calling station. After depositing the proper coin value a predetermined digit is dialled to raise the selector switch to a level where the CLR trunks are connected. The selector searches for an idle CLR trunk over lead C4, contacts 549′ and contacts 589′ and on finding battery completes a loop from the calling party's telephone through the finder, trunk circuit and selector and over contacts 511, 521 and 581, the upper primary of repeating coil 599 to battery through the upper winding of relay 535 and over contacts 512, 522, 582, contacts 561, 586 and 547 in shunt of relay 590, the lower primary of coil 599 to ground through the lower winding of relay 535. Relay 535 operates to close contacts 538 and light the operator's calling signal lamp CS individual to trunk circuit 500 over contacts 588. It also closes contacts 536 to complete a circuit over contacts 573 to slow-to-release relay 545. Relay 545 operates to remove one of the shunts from relay 590 at contacts 547. At contacts 546 it returns ring back tone over contacts 585, 562, 521 and 511 to the calling party. At contacts 549' it disconnects battery from the C4 lead and connects ground thereto at contacts 549 from contacts 592 which are shorting the lower winding of impedance 515, while at contacts 548 a circuit is prepared for relay 540.

If a paystation is calling, ground is forwarded from contacts 72 in the trunk circuit in a manner already mentioned and over the fourth wiper of the selector and lead EC4, when the selector switch through relay operates, to operate relay 560. Relay 560 removes the shunt at contacts 561 from relay 590. At contacts 562 it opens a point in the circuit which applies ring back tone to the calling party. At contacts 563 it completes a circuit, as relay 545 is operated from ground at contacts 548 and including contacts 553 to slow-to-release relay 540. At contacts 564 paystation identification tone is connected to the lower winding of impedance 515 but is shunted therefrom by contacts 592. Slow-to-release relay 540 closes contacts 541 to operate slow-to-release relay 530. Relay 530 closes contacts 531 to prepare a circuit for applying +110 volt refund potential to the calling line and at contacts 532 completes a circuit for slow-to-operate relay 520. Relay 520 operates to close contacts 523, 524 and 525. The +110 volt refund potential is now returned from contacts 531 back over both sides of the line at contacts 524 and 511 and 525 and 512 respectively to operate magnets 10 and 20 as previously explained. The original loop to relay 535 is open at contacts 521 and 522, however a new loop therefor is closed over contacts 523, 581 and the upper primary of coil 599 to battery through the upper winding of relay 535 over resistor 527, contacts 582, contacts 586 in shunt with relay 590, the lower primary of coil 599 to ground through the lower winding of relay 535 to maintain it operated. At contacts 526 a circuit is completed to slow-to-operate relay 550, which operates after a period of time to close contacts 551, 552 and 554 while opening contacts 553 to open the circuit to slow-to-release relay 540. Relay 540 restores to open the circuit to relay 530 which in turn restores to open the circuit to relay 520. Due to the respective slow-to-release characteristics of relays 540 and 520, the refund potential is applied for a long enough period to insure operation of magnets 10 and 20 at the paystation and the refund of the coin deposit. Relay 520 releases when its circuit is opened to open the original operating circuit for relay 550 at contacts 526. Relay 550 is held operated, however over contacts 552, 563 and 548. At contacts 554 an alternate circuit for applying ground to the C4 lead from contacts 592 is completed, while at contacts 551 the ring back tone is applied from contacts 546 and 585 to the calling line.

The operator on noticing her calling signal lamp CS is lighted answers the call by plugging her Cord Circuit 600 in at jack J2. Jack contacts J3 close to forward ground over lead H.

The operator operates her Talk Key to close contacts 601, 602, 603, 604, and 605. Ground on lead OG is forwarded through contacts 603 to operate relay 620 which locks up over contacts 626 and 602 to ground on lead HG. The ground on lead OG is then removed in any well-known manner. The T and R leads are now extended through the jack J2 and the plug over contacts 609, 621 and the RT lead and over contacts 610, 631 and the RR lead respectively to the operator's phone at the position circuit.

The operator when prepared to listen for the paystation identification tone manipulates the nonlocking push key momentarily to close contacts 606 and forward a momentary ground over the talk key contacts 605, contacts 630, the FR lead which is connected through the operator's position circuit in any well-known manner to the RR lead, contacts 631 and 610. The momentary ground is applied to lead R and through the lower secondary of coil 599 and contacts 575 to relay 570. Relay 570 operates from the momentary ground and closes contacts 574 to complete its own holding circuit from ground on lead H while opening its original operating circuit at contacts 575. At contacts 571 a talking loop is prepared including coil 599 and condenser 599', the T and R conductors, contacts 609, 621 and the RT lead and contacts 610, 631 and the RR lead respectively to the operator's telephone at the position circuit. At contacts 576 a circuit is completed to relay 580 and it operates to open the last shunt for relay 590 at contacts 586. At contacts 587 it completes its own holding circuit from ground at contacts 538, while disconnecting ground from the operator's calling signal lamp CS at contacts 588 to extinguish it. Contacts 589 provide an additional holding ground for relay 550 and at contacts 589' a point in the incomplete circuit for applying battery to lead C4 is opened. At contacts 585 it disconnects the ring back tone and at contacts 588' it provides another point for supplying ground to the C4 lead from contacts 592. Contacts 581 and 582 open to disconnect the original battery and ground from relay 535 to the calling line, and contacts 583 and 584 close to reverse the original battery and ground connections to the calling line from relay 535.

The circuit to relay 545 is opened at contacts 573 when relay 570 operates. Relay 545 being slow-to-release, however, maintains the shunt around relay 590 open at contacts 547 for a period of time. All the shunts around relay 590 being opened it operates in the loop to relay 535 to close contacts 591 to bridge the upper winding of impedance 515 across the primary of coil 599 while opening contacts 592 shunting paystation tone from the lower winding of impedance 515 thereby allowing the tone to be made effective. The tone is now transmitted over the upper winding of impedance 515, the primary and secondary of coil 599 and the operator's phone over the previously described loop thereto so that she may identify the paystation. Thus the operator can control the momentary paystation identification tone so that she may listen for it when she is ready. Relay 545 restoring, of course, replaces the shunt around relay 590 at contacts 547. Relay 590 restores to disconnect impedance 515 and shunt the lower winding thereof at contacts 592. Relay 545 on restoring also removes ground from relay 550 at contacts 548, but relay 550 is held operated from ground at contacts 589. Contacts 549' close but as contacts 589' are open battery cannot be applied to lead C4 nor is ground removed therefrom when contacts 549 open as contacts 554 and 588' are closed.

If she did not hear the tone before relay 545 restores she may remove her plug to open contacts J3 and release relay 570. Relay 570 restores to close contacts 573 and reoperates relay 545. This removes the shunt around relay 590 at contacts 547. The operator may now again insert her plug and close contacts 606 to reoperate relay 570 and listen for the paystation identification tone before relay 545 restores.

If the call is from a paystation, reversal of battery on the line by relay 500 operates magnet 30 at the paystation as previously described to throw it into the post-pay position, while also closing springs 31 to shunt itself and rectifier 5 from the line. It also connects the magnets 10 and 20 to the line over C.S. 13 as already explained. Magnet 30 and rectifier 5 being shunted from the line now enables conversation to be easily carried on between the operator and the calling party over a loop including the +L and −L conductors extended over the finder, trunk, selector, and over contacts 511, 521, 583, and contacts 547 and 586 each shunting relay 590, and over contacts 512, 522, and 584, respectively, to coil 599 and the previously described operator's loop through her cord circuit.

The operator on securing the desired information may now proceed to connect to the called party by inserting her front plug in the jack connected to Toll Line Circuit 650 which is connected to the desired exchange. She disconnects the RT, RR and RS leads at her position circuit and proceeds to operate the Front Ring Key to close contacts 635, 636 and 639 and open contacts 637, 638 and 640. She then restores the key to open the aforementioned contacts. Contacts 636 and 639 on closing applied battery and ground over the front tip and ring conductors, respectively, to operate a relay (not shown) in the Toll Line Circuit for sending ringing current over the line to signal the operator at the succeeding exchange in any well-known manner. That operator on securing the called party connects that party through to Cord Circuit 600 over contacts 637, 622 and contacts 638, 630 to FR and FT, respectively, whereby the operator controlling Cord Circuit 600 may converse with the called party.

The operator at Cord Circuit 600 now requests the calling party to deposit the required coin value. The coins falling through the coin chute generate tones in the coin transmitter 9 which are forwarded over the talking loop to coil 599 and repeated thereover so that the operator may identify the coin value. The coins fall directly into the coin hopper without any collect attempt, due to the calling paystation being in the postpay position after the operation of magnet 30. To connect lead RT to lead FT and lead RR and thereby complete the talking circuit between the calling and called parties including the portion of the talking circuit already described, the operator simply manipulates the key at her position circuit. The operator, of course, then releases her Talk Key to restore contacts 601–605. Contacts 602 on opening restore relay 620, and on its restoration, it disconnects leads RT from FT and RS from FS and also RR from FR, respectively, and connects the final talking circuit between the parties from the T and R conductors over contacts 609, 623 and 637 and over contacts 610, 629 and 638, respectively, and over the Toll Line Circuit 650 to the called party.

On a call from a non-paystation line, ground is not forwarded over lead EC4 to operate relay 560 due to the fact that the normal post springs B in the finder do not close to operate relay 70. As relay 560 is not operated the aforedescribed sequence for providing refund potential to the calling line cannot be completed nor is battery reversed on the line. The operator is not given the paystation identification tone signal when she tests therefor due to contacts 564 being open and contacts 561 closed. She may therefore proceed to secure the desired information, connect the called party as described and ticket the call.

If the calling party has replaced his handset to open the calling loop, before the called party is connected, the operator must rering the calling party. On opening of the calling loop, relay 535 restores to close contacts 537 and operate the supervisory lamp 651 over the S lead, contacts 612 and 627, if the operator has restored her talk key to release relay 620 as explained. Otherwise the lamp circuit is completed from contacts 612, 628, RS lead through the operator's position circuit, RL lead therefrom, and contacts 604 of the talk key. The operator then knows the calling party has restored. In the CLR Trunk 500, relay 545 is already restored so that contacts 536 on opening have no effect and likewise relay 580 is held from contacts 576 so that contacts 538 on opening are ineffective to rest on relay 580. The switch train is held by ground from contacts 592 forwarded to the C4 lead over contacts 588' and also 554 in shunt therewith if a paystation called.

On securing the called party the operator proceeds to ring the calling party by operating the Rear Ring Key to connect battery over contacts 608, the T lead, secondary of coil 599, relay 510, contacts 572, lower secondary of coil 599, R conductor and contacts 611 to ground to operate relay 510. Relay 510 closes contacts 513 and 514 to send ringing current back over the line to operate the calling party's ringer. When the operator restores the Rear Ring Key contacts 608 and 611 open to restore relay 510 and cut off the ringing current. The calling party on hearing the ring removes his handset and when relay 510 is restored reestablishes the loop to relay 535 and the talking loop to the operator. The operator either tickets the call or requests the proper coin deposit if the calling party is at a paystation, and then restores the Talk Key to establish the described final talking loop.

On release of the connection by the calling party, the loop to relay 535 is opened and it restores to close contacts 537 and operate the cord circuit lamp 651 over lead S, and contacts 612 and 627 whereby the operator is signalled that the calling party has disconnected. A similar arrangement is provided on the called end of the cord circuit for operating lamp 652 over contacts 640 and 625 in response to the called party disconnecting. The operator now removes her plug to disconnect the lamp 651 and open contacts J3 to restore relay 570. Contacts 538 and 576 being open enables relay 580 to restore and it in turn opens contacts 589 to restore relay 550, if it had been operated as a result of a call from a paystation. Contacts 588' and 554 now being open, ground is disconnected from lead C4 and the Selector 200 releases. Battery is placed on the C4 lead from contacts 589' and 549' so that the CLR Trunk 500 is indicated as idle on calls thereto.

The selector on restoring removes ground from lead C' to restore relay 80 and operate the trunk circuit relays 50 and 40 in a manner described to apply +110 volt refund potential to magnets 10 and 20 all as previously described. Relays 40, 50 and 60 and magnets 10 and 20 then are all restored as previously described. It will be understood that relay 80 restores to disconnect ground from the C lead at contacts 83 to allow the finder to release immediately, if the call did not originate at a paystation as relay 60 is then not operated.

One embodiment of my invention has been described in the foregoing specification, but as the invention is capable of many adaptations and modifications without departing from the scope or spirit thereof, I believe my protection should be extended to the area of invention described in the accompanying claims.

What is claimed is:

1. A telephone system having a prepay paystation equipped with means operable for converting said paystation to a postpay paystation and operable for reconverting said paystation to a prepay paystation, means associated with said paystation whereby a connection may be established from said paystation to an operator's position, means responsive to the extension of a call from said paystation to said operator's position for operating said means for converting said prepay paystation to a postpay paystation, and means thereafter effective for operating said means for converting said paystation from a postpay paystation to a prepay paystation.

2. In a system such as claimed in claim 1, means operated on extension of a call to said prepay paystation for operating said means for converting said paystation to a postpay paystation, and means thereafter effective for operating said means for converting said paystation from a postpay paystation to a prepay paystation.

3. In a telephone system having a paystation equipped with a coin receiving and control apparatus which prevents the extension of a call unless a coin is received, said apparatus arranged so that a received coin is collected under certain circumstances merely by being received and is arranged to refund a coin received therein under other circumstances, the improvement comprising means for establishing said certain circumstances if a call from said paystation proceeds in one manner to thereby cause all coins received thereat to be collected merely by being received, and means for establishing said other circumstances if a call from said paystation proceeds in another manner to thereby cause a received coin to be refunded.

4. A telephone system having a prepay paystation equipped with means operable for converting said paystation to a postpay paystation, said means also operable for refunding a deposited coin or for converting said paystation from a postpay paystation to a prepay paystation, the improvement comprising means operated on a call involving said paystation for operating said means for converting said prepay paystation to a postpay paystation, and means operated on termination of a call involving said paystation for operating said means for converting said paystation from a postpay to a prepay paystation.

5. A telephone system having a paystation with a coin magnet apparatus arranged to be operated from a normal position into one position for collecting a coin on deposit at the paystation and thereafter maintained in said one position to enable any coin thereafter deposited at said paystation to be collected without further operation of said coin apparatus and also arranged to be returned to said normal position on application thereto of a predetermined electrical pulse, the improvement comprising means operated in response to the completion of a certain connection from said paystation for operating said magnet apparatus from said normal position to said one position for collecting a coin on deposit and enabling any coin thereafter deposited at said paystation to be collected without further operation of said apparatus, and means operated in response to the release of said connection for applying a predetermined electrical pulse to said magnet apparatus for returning said apparatus to said normal position.

6. For use in a telephone system having a prepay paystation equipped with a coin control mechanism operable for collecting a deposited coin and thereafter maintained in a position whereby any deposited coin is collected by virtue of its deposit, said mechanism operable to its unoperated position, means for operating said mechanism on the completion of a call so that any coin thereafter deposited is collected by virtue of its deposit, and means for thereafter operating said mechanism to return it to its unoperated position.

7. In a telephone system having a paystation equipped with a coin receiving arrangement and control apparatus which permits the extension of a call only if a coin is deposited in said coin receiving arrangement, said apparatus controllable to permit a coin received after an answer of an extended call to be collected by virtue of the deposit thereof, said apparatus also controllable to refund a deposited coin if said coin has not been collected, switching equipment whereby a connection may be extended from said paystation, after deposit of a coin thereat, to an operator's position, means operated on completion of a connection to a said position for controlling said apparatus for refunding a coin received at said paystation, and means thereafter operated for controlling said coin control apparatus so that any coin received thereafter is collected by virtue of its deposit.

8. A system such as described in claim 7 in which said operator's position is accessible to said paystation and to non paystation lines, means controlled by an operator at a time determined by said operator after she has responded to a connection extended to said position for signalling said operator for a predetermined time only if a connection is extended thereto from said paystation whereby said operator may request over the connection the deposit of a coin which is collected by virtue of its deposit, and means operated in response to the termination of said call for controlling said apparatus to prevent the collection of a coin by virtue of its deposit.

9. In a telephone system of the type having a prepay paystation from which a call may be completed to one of a number of called lines or to an operator's position, a coin apparatus at said paystation arranged to be operated from a normal position into one position for collecting a coin on deposit at said paystation and thereafter maintained in said one position to enable any coin thereafter deposited at said paystation to be collected without further operation of said coin apparatus and also arranged to be returned to said normal position on application thereto of a predetermined electrical pulse, the improvement comprising means operated in response to the completion of a call from said paystation to one of said called lines or to said operator's position for operating said apparatus to said one position for collecting a coin on deposit and enabling any coin thereafter deposited at said paystation to be collected, and means operated in response to the release of said call for applying a predetermined electrical pulse to said apparatus for returning said apparatus to said normal position.

10. In a system such as described in claim 9, signal means at said operator's position responsive only to said paystation being connected to said position for enabling a signal to be provided to the operator at said position, and means operated at a time determined by the operator at said position after she has answered a call directed to said position for automatically controlling said signal to be provided for a predetermined time to inform the operator that said paystation is connected to said position.

11. A telephone system having a paystation with a coin magnet apparatus operated from a normal position into one position for collecting a coin on deposit at a paystation and thereafter maintained in said one position to enable any coin thereafter deposited at said paystation to be collected without further operation of said coin apparatus, said apparatus operated to said normal position on application thereto of a predetermined electrical pulse, switching equipment controlled from said paystation only on deposit of a coin thereat whereby a connection may be automatically completed from said paystation to another line or to an operator's position, the improvement comprising means operated on answer of an established connection from said paystation to said other line for operating said coin apparatus to said one position for collecting a coin on deposit at said paystation and enabling any coin thereafter deposited at said paystation to be collected, means operated on release of said connection for applying a predetermined electrical pulse to said magnet apparatus for returning said apparatus to said normal position, and means at said operator's position operated on completion of a connection thereto by said paystation for operating said coin magnet apparatus to said one position for enabling any coins thereafter deposited at said paystation to be collected without any further operation.

12. In a telephone system such as claimed in claim 11, means at said operator's position effective when a connection is established thereto for operating said coin magnet apparatus to refund a coin on deposit at said paystation before said apparatus is operated to said one position, and means effective for returning said coin magnet apparatus to normal on termination of said connection to said operator's position.

13. For use in a telephone system having a calling line with means for establishing a call to a called line or to an operator's position, a coin controlled arrangement at said calling line whereby a coin must be deposited before a call can be established, apparatus operated on completion of a call from said calling line for collecting a deposited coin and thereafter maintained in a position where any coin deposited is collected in a post pay manner, said apparatus operated to refund a deposited coin and to return said apparatus from said position thereby preventing the postpay collection of a coin deposited thereafter on the application to said apparatus of a predetermined potential, the improvement comprising means operated on the answer of an established call to said called line for operating said apparatus to collect a coin on deposit, other means operated on the termination of a call to said called line or on completion of a call to said operator's position for applying said potential to said apparatus for operating said apparatus for returning said apparatus from said position or for refunding a coin on deposit respectively, and means operated after said other means on a call to said operator's position for operating said apparatus so that it is thereafter maintained in a position where any coin deposited thereafter is collected in a postpay manner.

14. In a system such as described in claim 13 means at said operator's position operated at a time determined by the operator at said position after answer of a call to said position to provide a signal for a predetermined time when a call is established from said paystation to said position.

15. An arrangement for a paystation having means for extending a connection to a central office over one conductor normally having ground connected thereto and another conductor normally having battery connected thereto, said conductors being connected together at said paystation through springs which may be opened and closed to disconnect and connect said conductors for operating the central office equipment, the improvement comprising a ground connection at said paystation, an impedance connected on one side to said one conductor on deposit of a coin at said paystation and on the other side to said ground connection, and a unidirectional circuit element connected in series with said impedance between said impedance and said ground connection.

16. An arrangement for a paystation of the type whereat a coin must be deposited to permit a call from said paystation to be automatically completed over a two conductor line, the improvement comprising a coin magnet, a unidirectional circuit element having ground potential on one side thereof and connected on its other side in series with said coin magnet, and means operated on deposit of a coin at said paystation for connecting said coin magnet and said unidirectional circuit element to one conductor of said two conductor line.

17. In a telephone system, a line, a paystation connected to said line, an operator position, switching equipment, coin receiving apparatus at said paystation operated in response to the deposit of a coin for conditioning said paystation to control said switching apparatus to extend a connection to said operator position, coin control apparatus at said paystation having a normal position, a refund position and a collect position, said apparatus automatically controlled from said operator position in response to said connection to move from said normal position to said refund position to refund said deposited coin and thereafter automatically controlled in response to the answer by said operator of said connection to move from said refund position to said collect position so that a coin deposited at the request of the operator for a demanded connection including said paystation and said operator position is collected, and means at said operator position thereafter operated for controlling said coin control apparatus to move from said collect position to said normal position, so that all of the coins thereafter deposited are either collected or refunded.

References Cited in the file of this patent

UNITED STATES PATENTS

| | | |
|---|---|---|
| 2,041,933 | Inglis | May 26, 1936 |
| 2,073,508 | Williams | Mar. 9, 1937 |
| 2,372,262 | Edwards et al. | Mar. 27, 1945 |
| 2,672,513 | Lomax | Mar. 16, 1954 |